(12) United States Patent
Dornblut et al.

(10) Patent No.: US 10,440,249 B2
(45) Date of Patent: Oct. 8, 2019

(54) VEHICLE VISION SYSTEM CAMERA WITH SEMI-REFLECTIVE AND SEMI-TRANSMISSIVE ELEMENT

(71) Applicant: MAGNA ELECTRONICS INC., Auburn Hills, MI (US)

(72) Inventors: Johannes Dornblut, Estenfeld (DE); Wilhelm Woehlte, Sailauf (DE); Michael Junglas, Elsenfeld (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/866,503

(22) Filed: Jan. 10, 2018

(65) Prior Publication Data

US 2018/0205859 A1 Jul. 19, 2018

Related U.S. Application Data

(60) Provisional application No. 62/445,913, filed on Jan. 13, 2017.

(51) Int. Cl.
*H04N 5/225* (2006.01)
*B60R 11/04* (2006.01)

(52) U.S. Cl.
CPC .......... *H04N 5/2258* (2013.01); *B60R 11/04* (2013.01); *H04N 5/2254* (2013.01); *B60R 2300/103* (2013.01)

(58) Field of Classification Search
CPC ... H04N 5/2258; H04N 5/23203; B60R 11/04
USPC ..... 348/118, 120, 142, 148, 153, 36, 47, 48, 348/49, 50, 64, 73, 202, 208.12, 208.11, 348/231.6, 291, 360, 373, 374, 706, 719, 348/782, 783, 837; 340/425.5, 426.16, 340/426.23, 932.2, 933, 988, 994, 995.17
See application file for complete search history.

(56) References Cited

U.S. PATENT DOCUMENTS

| 4,277,804 A | * | 7/1981 | Robison ............. B60R 1/00 348/148 |
|---|---|---|---|
| 5,550,677 A | | 8/1996 | Schofield et al. |
| 5,561,521 A | * | 10/1996 | Chase .............. G01J 3/4535 356/451 |
| 5,670,935 A | | 9/1997 | Schofield et al. |
| 5,760,962 A | | 6/1998 | Schofield et al. |
| 5,796,094 A | | 8/1998 | Schofield et al. |
| 5,877,897 A | | 3/1999 | Schofield et al. |
| 5,949,331 A | | 9/1999 | Schofield et al. |

(Continued)

*Primary Examiner* — Jefferey F Harold
*Assistant Examiner* — Mustafizur Rahman
(74) *Attorney, Agent, or Firm* — Honigman LLP

(57) ABSTRACT

A vision system for a vehicle includes a camera module configured to be disposed at the vehicle so as to have a field of view exterior of the vehicle. The camera module includes a lens, a mirror reflector element, a first imager and a second imager. The mirror reflector element is disposed along a longitudinal axis of the lens and between the lens and the first imager. The second imager is disposed so as to receive light reflected off of the mirror reflector element. The mirror reflector element is partially transmissive to a first type of radiation and is partially reflective to a second type of radiation incident thereon. The first imager is more sensitive than the second imager to the first type of radiation, and the second imager is more sensitive than the first imager to the second type of radiation.

15 Claims, 3 Drawing Sheets

(56) References Cited

U.S. PATENT DOCUMENTS

| | | |
|---|---|---|
| 6,396,397 B1 | 5/2002 | Bos et al. |
| 6,455,851 B1 * | 9/2002 | Lord .................... G01N 21/33 250/338.5 |
| 6,930,593 B2 * | 8/2005 | Crawshaw ............ B60Q 9/008 340/435 |
| 7,005,974 B2 | 2/2006 | McMahon et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,090,234 B2 | 7/2015 | Johnson et al. |
| 9,092,986 B2 | 7/2015 | Salomonsson et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 2002/0003571 A1 * | 1/2002 | Schofield ................ B60C 23/00 348/148 |
| 2005/0131607 A1 * | 6/2005 | Breed .................... B60N 2/002 701/45 |
| 2008/0036580 A1 * | 2/2008 | Breed ............... B60R 21/01536 340/438 |
| 2008/0294315 A1 * | 11/2008 | Breed .................... B60N 2/002 701/49 |
| 2010/0208032 A1 * | 8/2010 | Kweon .................. G03B 37/00 348/36 |
| 2011/0157907 A1 * | 6/2011 | Hwang ................ B60Q 1/2665 362/494 |
| 2012/0033079 A1 * | 2/2012 | Karl ...................... B60R 11/04 348/148 |
| 2012/0105808 A1 * | 5/2012 | Feng .................. G02B 27/0101 353/20 |
| 2013/0300146 A1 * | 11/2013 | Ogawa ...................... B60J 1/02 296/84.1 |
| 2014/0313335 A1 * | 10/2014 | Koravadi ............... H04N 7/181 348/148 |
| 2016/0180180 A1 * | 6/2016 | Gupta ................ G06K 9/00798 |
| 2016/0273963 A1 * | 9/2016 | Herrick .................. G01J 3/2803 |
| 2017/0102327 A1 * | 4/2017 | Gohmann ............. B60S 1/0833 |
| 2018/0141496 A1 * | 5/2018 | Loehr ...................... B60R 1/00 |

\* cited by examiner

VEHICLE VISION SYSTEM CAMERA WITH SEMI-REFLECTIVE AND SEMI-TRANSMISSIVE ELEMENT

CROSS REFERENCE TO RELATED APPLICATION

The present application claims the filing benefits of U.S. provisional application Ser. No. 62/445,913, filed Jan. 13, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or U.S. Pat. No. 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a dual imager camera with a light or radiation splitter or separator for transmitting and reflecting light or radiation to respective ones of two imagers.

According to an aspect of the present invention, a vision system of a vehicle includes a camera module disposed at a vehicle and having a field of view exterior of the vehicle. The camera comprises a lens, a mirror reflector element, a first imager and a second imager. The mirror reflector element is disposed along a longitudinal axis of the lens and between the lens and the first imager. The mirror reflector element is angled relative to the longitudinal axis and the second imager is disposed so as to receive light reflected off of the mirror reflector element. The mirror reflector element is partially transmissive to a first type of radiation and is partially reflective to a second type of radiation incident thereon, and the first imager is sensitive to the first type of radiation and the second imager is sensitive to the second type of radiation.

Optionally, one of the first or second types of radiation may comprise visible color light, and the other type of radiation may comprise infrared (IR) or near infrared (NIR) radiation. Optionally, the first and second types of radiation may be the same such that the mirror reflector element is partially reflective of the radiation and partially transmissive of the radiation. The two imagers may then capture image data for different features or functions, such as for machine vision (such as object detection or the like) and/or imaging display systems (such as for displaying color video images at a display screen viewable by a driver of the vehicle). An image processor thus may process image data captured by the first imager for a first function (such as one of object detection or video display) and may processes image data captured by the second imager for a second function (such as the other of object detection or video display).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
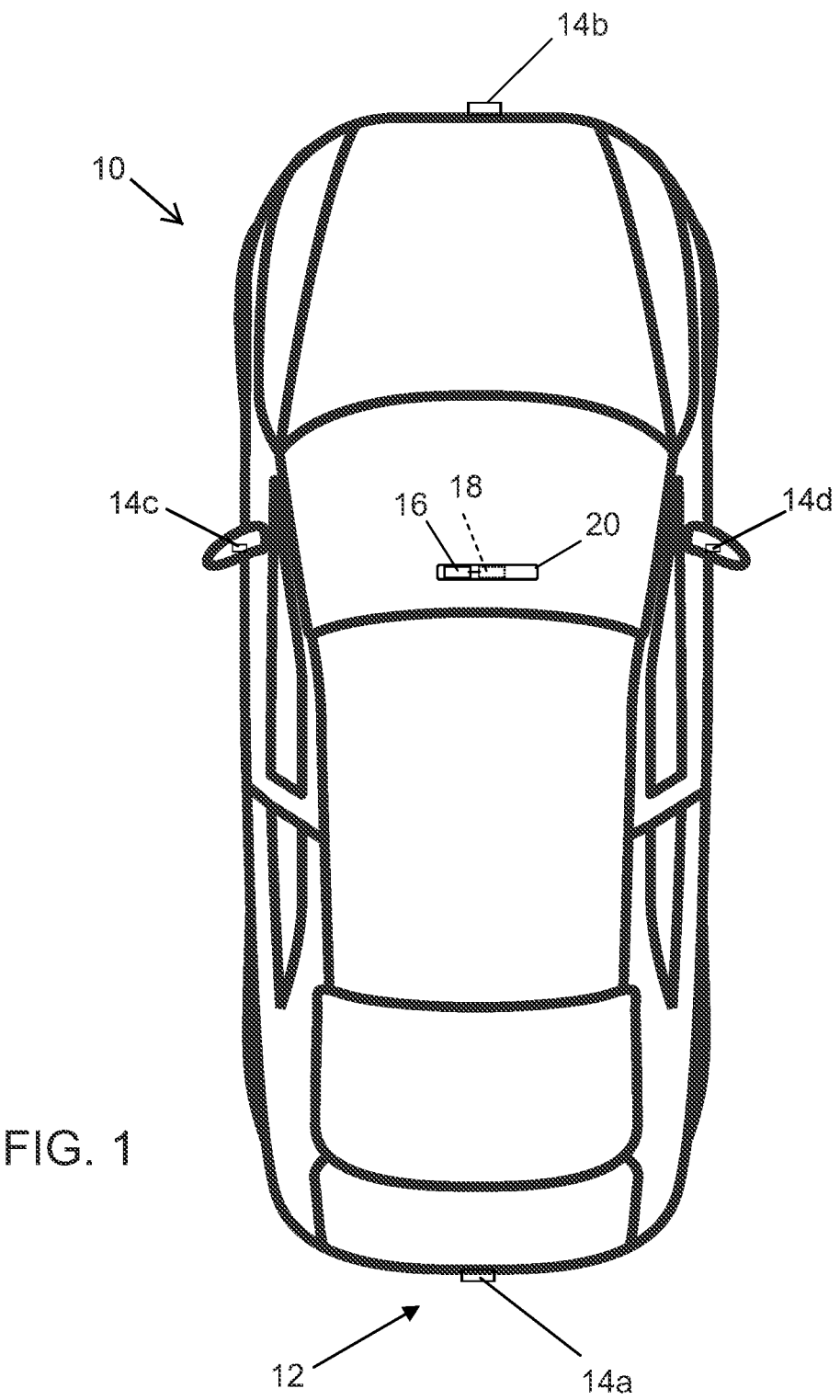
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
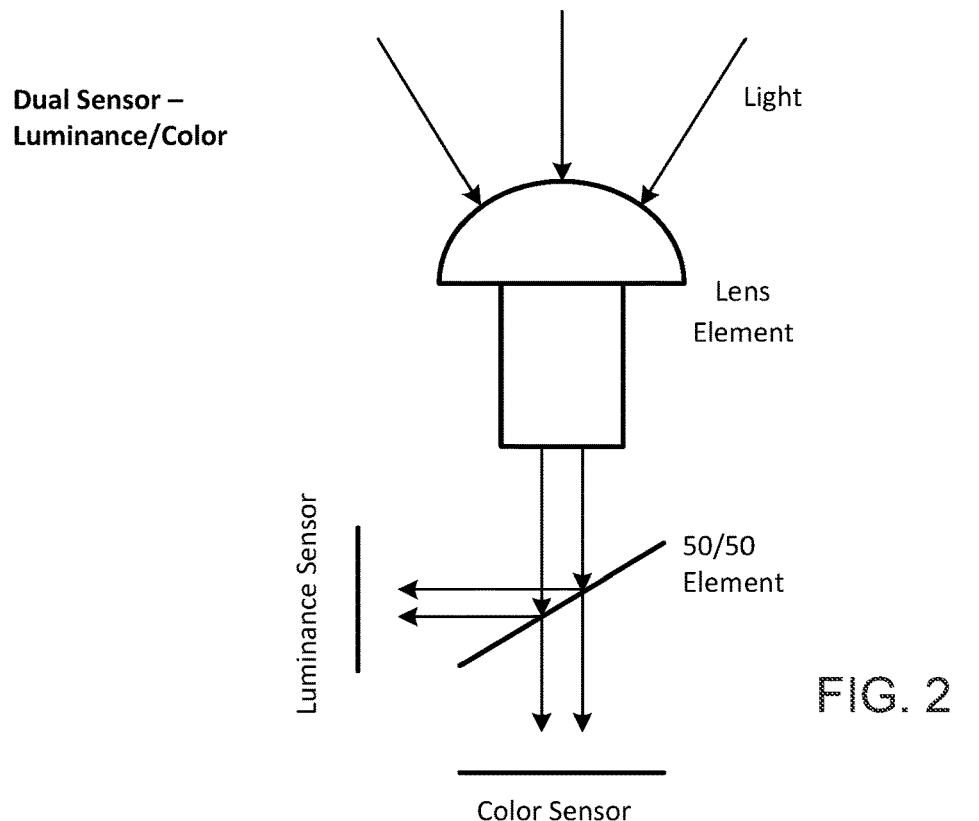
FIG. 2 is a schematic of a dual sensor camera having two sensors integrated at one camera housing and using a common lens system, with an optical element that divides the incoming light ray into two separate rays or paths, with one ray steered to a color image sensor and the other ray steered to a luminance sensor.

A vehicle vision system camera or camera module may have a semi-reflective or partially reflective, semi-transparent or semi-light transmissive mirror element disposed behind a single lens stack for dividing the incoming light into two portions or beams or paths (which may be 50%/50% or in a different ratio), which are projected on two imagers (see FIG. 2). One of the imagers may comprise a luminance sensitive imager, and the other imager may comprise a RGB (red, green, blue) color sensitive imager. As shown in FIG. 2, the dual sensor includes a lens assembly or lens system with the partially reflective, partially transmissive element (50/50 element) at an angle relative to the optical axis of the lens (such as at a 45 degree angle relative to the optical axis). In the illustrated embodiment, the partially reflective, partially transmissive element reflects some light (such as light within a particular spectral band or bands) and transmits other light (such as light within a separate or different or distinct spectral band or bands). Thus, light received by and passing through the lens is partially reflected at the element and reflected toward one of the imagers (such as light reflecting toward the luminance imager as shown in FIG. 2), while other light (such as visible color light) passes through the element and is received by the other imager (such as the color sensor shown in FIG. 2). The element may separate different types of light (i.e., light having different spectral bands) and/or may transmit or pass some of the light and reflect some of the light.

The control parameters of the luminance imager may be controlled independent from the RGB imager. Because the RGB imager may have a standard Bayer pattern with two green, a red and a blue sensitive pixel in a pattern, the luminance resolution of the RGB imager may be at about the half of the luminance imager. Optionally, both imagers' output images may be merged into one by using a super resolution algorithm, which will produce a sharper image than using just two RGB imagers, since for the sharpness conception the luminance resolution is much more important than the correct color localization.

Figure 3:
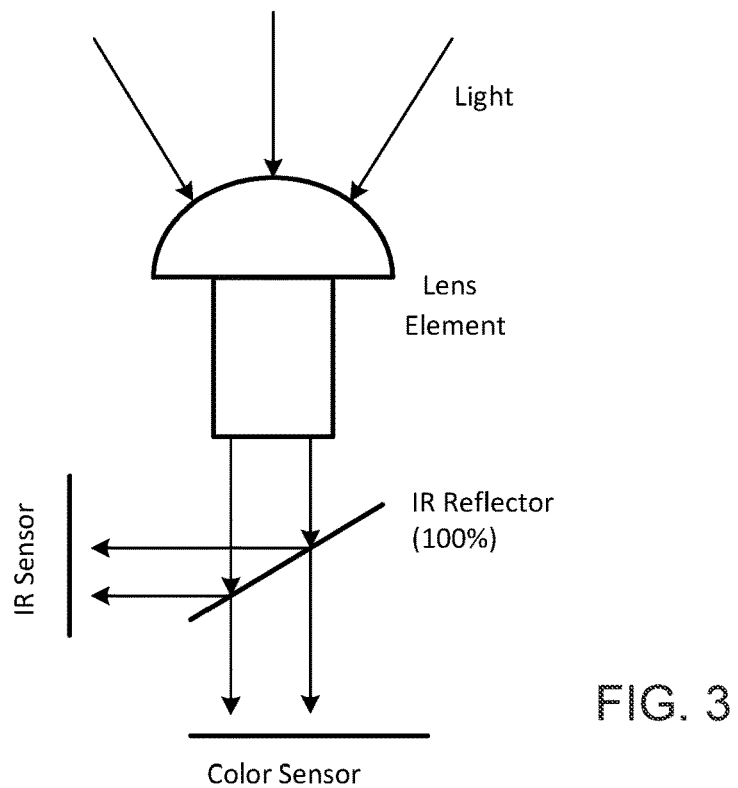
FIG. 3 is a schematic of another dual sensor camera, shown with a color sensor and a night vision sensor, with an optical element that separates the IR part of the incoming ray and steers it to an IR sensor, and with the color sensor receiving the remaining part of the light that passes through the IR reflector.

Optionally, the vehicle vision system may serve as a night vision system. The focal length of the infrared (IR) is slightly different to visible light. The optics' focal length has a corresponding imager distance. Typically, optics can only be optimal in one frequency, being as more suboptimal as the light's frequency differs more from the frequency to which the optics were optimized. As shown in FIG. 3, for being able to use an optic for which achromatic aberration compensation is made for RGB and for IR, the incoming light may be split into an IR beam or path and a RGB beam or path by a mirror element that is at least partially reflective to IR light or electromagnetic radiation and at least partially transparent or transmissive to visible or RGB light (or optionally an element that is the other way around, reflective to RGB light and transmissive to IR light, may be implemented) for guiding the IR light to an IR sensitive imager and the remaining visible color light or RGB light to an RGB imager. Both images may appear sharply on the imagers since the distance of the IR imager to the element may be selected to optimize focusing of the IR light and the distance of the RGB sensor to the element may be selected to optimize focusing of the visible color RGB light.

Figure 4:
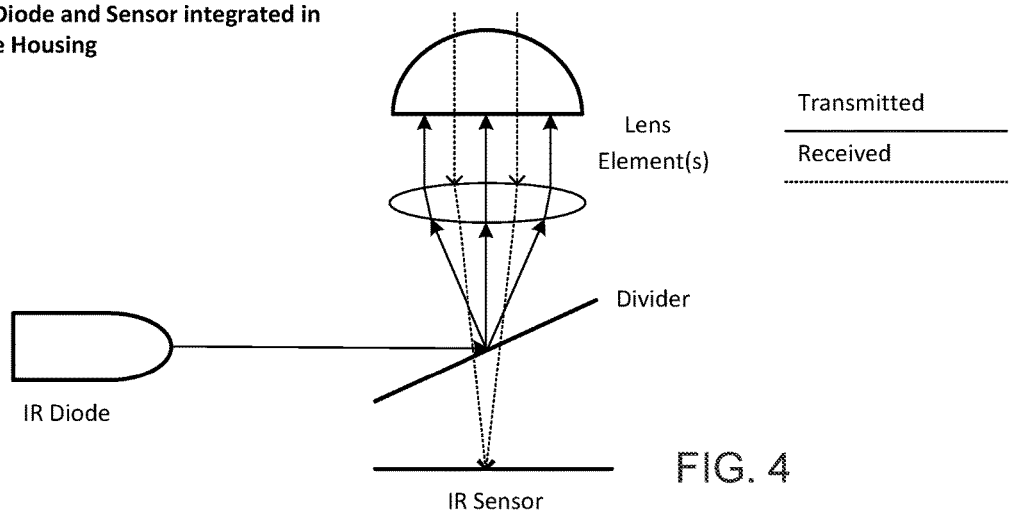
FIG. 4 is a schematic of another camera, shown with an IR diode and an IR sensor integrated in one camera housing, with optical elements that steer the beam of the IR diode out of the device, and with the IR sensor receiving reflected IR radiation.

With reference to FIG. 4, another example of the present invention includes a semi-reflective and semi-transmissive mirror element in the optical path of the camera optics system for coupling with an IR light source or diode. IR light emitted by the IR light-emitting light emitting diode (LED) will partially reflect off of the angled mirror reflector element to illuminate the outside area encompassed by the field of view of the camera, such as when the camera is capturing image data or when the system is recording images. And light received through the lens (including the IR light illuminating the scene viewed by the camera and reflecting off objects in the field of view of the camera) will pass through the mirror reflector element so as to be received by the IR sensor. Such a mirror reflector element thus may be semi-transmissive (such as, for example, 50 percent transmissive of IR light incident thereat) to the used IR. The light that gets reflected from the scene outside passes through the optics and partially passes through the mirror reflector element, with some of that light also being reflected by the semi-reflecting mirror reflector element towards the light source.

Figure 5:
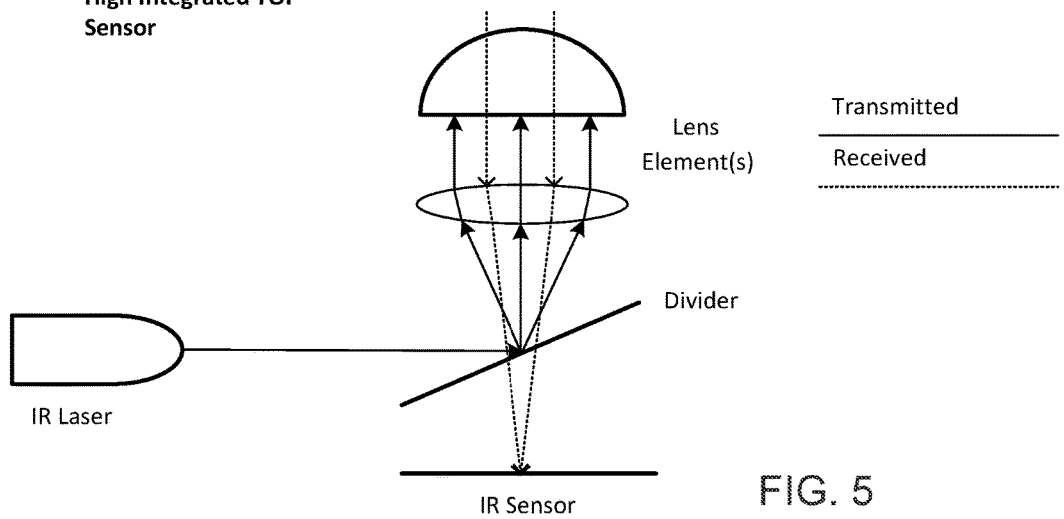
FIG. 5 is a schematic of another camera, shown with an integrated time of flight (TOF) sensor, with an IR laser diode beam steered out of the device using optical elements, and with an IR sensor receiving reflected laser radiation.

Optionally, the light source may comprise an IR LASER diode. Optionally, the system may comprise a flash time of flight (TOF) emitter and a camera detector system, such as shown in FIG. 5.

Therefore, the present invention provides a camera module having an imager and a lens and a mirror reflector element disposed in the optical path between the imager and lens. The mirror reflector element is partially light reflecting and partially light transmitting, such that some of the light that passes through the lens also passes through the mirror reflector element so as to be received by the imager, and some of the light that passes through the lens reflects off of the angled mirror reflector element. The reflected light may be received by a second imager of the camera module. Optionally, the mirror reflector element may at least partially reflect a particular type of light or electromagnetic energy and may at least partially transmit another particular type of light or electromagnetic energy, such that the two imagers may be selectively disposed so as to receive a type of light or electromagnetic energy that they are particularly sensitive to. For example, the mirror reflector element may be partially or substantially reflective of visible color light (encompassing light or electromagnetic energy or radiation within a spectral band having wavelengths between, for example, 400 nm and 700 nm) incident thereon and a visible color light sensitive imager may be disposed orthogonally to the optic axis of the lens, such that the reflected visible color light is received by the visible color light sensitive imager, while the mirror reflector element may be partially or substantially transmissive of infrared or near infrared radiation (encompassing electromagnetic energy or radiation within a spectral band having wavelengths between, for example, 700 nm and 1,000 nm) incident thereon and an infrared or near infrared radiation sensitive imager may be disposed along the optic axis of the lens (and behind the mirror reflector element), such that the transmitted infrared or near infrared radiation is received by the infrared or near infrared radiation sensitive imager.

The properties of the mirror reflector element and the sensitivities of the imagers may be selected depending on the particular application (e.g., desire for color imaging and night vision with one camera). The imagers may be principally sensitive to the radiation transmitted or reflected thereat by the reflector element. For example, the color imager may be more sensitive to light or electromagnetic energy or radiation within a spectral band having wavelengths between, for example, 400 nm and 700 nm, than to infrared or near infrared radiation, while the infrared imager may be more sensitive to light or electromagnetic energy or radiation within a spectral band having wavelengths between, for example, 700 nm and 1,000 nm, than to visible light.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or U.S. Pat. No. 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 6,396,397; 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or U.S. Pat. No. 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or U.S. Pat. No. 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera configured to be disposed at a vehicle so as to have a field of view exterior of the vehicle;
   wherein said camera comprises a lens, a mirror reflector element, a first imager and a second imager;
   wherein said mirror reflector element is disposed along a longitudinal axis of said lens and between said lens and said first imager;
   wherein said mirror reflector element is angled relative to said longitudinal axis and wherein said second imager is disposed so as to receive light reflected off of said mirror reflector element;
   wherein said mirror reflector element is oriented at a 45 degree angle relative to the longitudinal axis of said lens;
   wherein said second imager comprises an image plane that is parallel to the longitudinal axis of said lens;
   wherein said first imager comprises an image plane that is perpendicular to the longitudinal axis of said lens;
   wherein said mirror reflector element is partially transmissive to a first type of radiation and is partially reflective to a second type of radiation incident thereon;
   wherein the first type of radiation passes through said mirror reflector element so as to be received at said first imager;
   wherein the second type of radiation reflects off of said mirror reflector element so as to be received at said second imager;
   wherein said first imager is more sensitive than said second imager to the first type of radiation, and wherein said second imager is more sensitive than said first imager to the second type of radiation; and
   an image processor operable to, with said camera disposed at the vehicle, process first image data captured by said first imager and second image data captured by said second imager.

2. The vision system of claim 1, wherein the first type of radiation comprises visible color light, and wherein the second type of radiation comprises infrared radiation.

3. The vision system of claim 1, wherein the first type of radiation comprises infrared radiation, and wherein the second type of radiation comprises visible color light.

4. The vision system of claim 1, wherein a spectral band of the first type of radiation is different than a spectral band of the second type of radiation.

5. The vision system of claim 1, wherein a spectral band of the first type of radiation at least partially encompasses a spectral band of the second type of radiation.

6. The vision system of claim 1, wherein, with said camera disposed at the vehicle, said image processor processes first image data captured by said first imager for a first function and processes second image data captured by said second imager for a second function.

7. The vision system of claim 6, wherein the first function comprises one of object detection or image display and the second function comprises the other of object detection or image display.

8. A vision system for a vehicle, said vision system comprising:
   a camera configured to be disposed at a vehicle so as to have a field of view exterior of the vehicle;
   wherein said camera comprises a lens, a mirror reflector element, a first imager and a second imager;
   wherein said mirror reflector element is disposed along a longitudinal axis of said lens and between said lens and said first imager;
   wherein said mirror reflector element is angled relative to said longitudinal axis and wherein said second imager is disposed so as to receive light reflected off of said mirror reflector element;
   wherein said mirror reflector element is partially transmissive to a first type of radiation and is partially reflective to a second type of radiation incident thereon;
   wherein a spectral band of the first type of radiation is different than a spectral band of the second type of radiation;
   wherein said first imager is more sensitive than said second imager to the first type of radiation, and wherein said second imager is more sensitive than said first imager to the second type of radiation;
   an image processor operable to, with said camera disposed at the vehicle, process first image data captured by said first imager and second image data captured by said second imager; and
   wherein, with said camera disposed at the vehicle, said image processor processes first image data captured by said first imager for a first function and processes second image data captured by said second imager for a second function.

9. The vision system of claim 8, wherein the first type of radiation comprises visible color light, and wherein the second type of radiation comprises infrared radiation.

10. The vision system of claim 8, wherein the first type of radiation comprises infrared radiation, and wherein the second type of radiation comprises visible color light.

11. The vision system of claim 8, wherein the first function comprises one of object detection or image display and the second function comprises the other of object detection or image display.

12. The vision system of claim 8, wherein said mirror reflector element is oriented at a 45 degree angle relative to the longitudinal axis of said lens.

13. The vision system of claim 12, wherein said second imager comprises an image plane that is parallel to the longitudinal axis of said lens.

14. The vision system of claim 8, wherein said first imager comprises an image plane that is perpendicular to the longitudinal axis of said lens.

15. The vision system of claim 8, wherein the first type of radiation passes through said mirror reflector element so as to be received at said first imager.

* * * * *